United States Patent Office 3,068,105
Patented Dec. 11, 1962

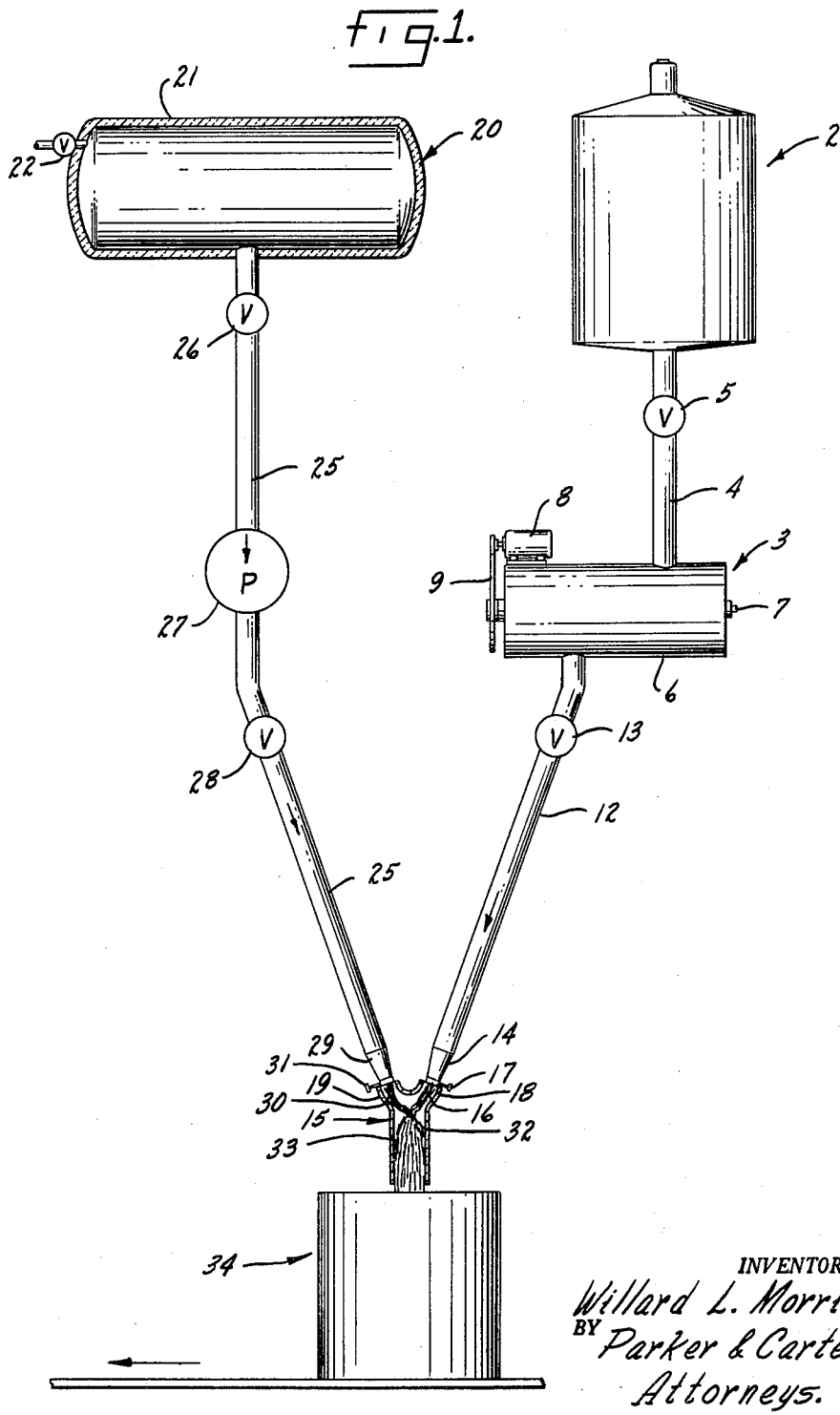

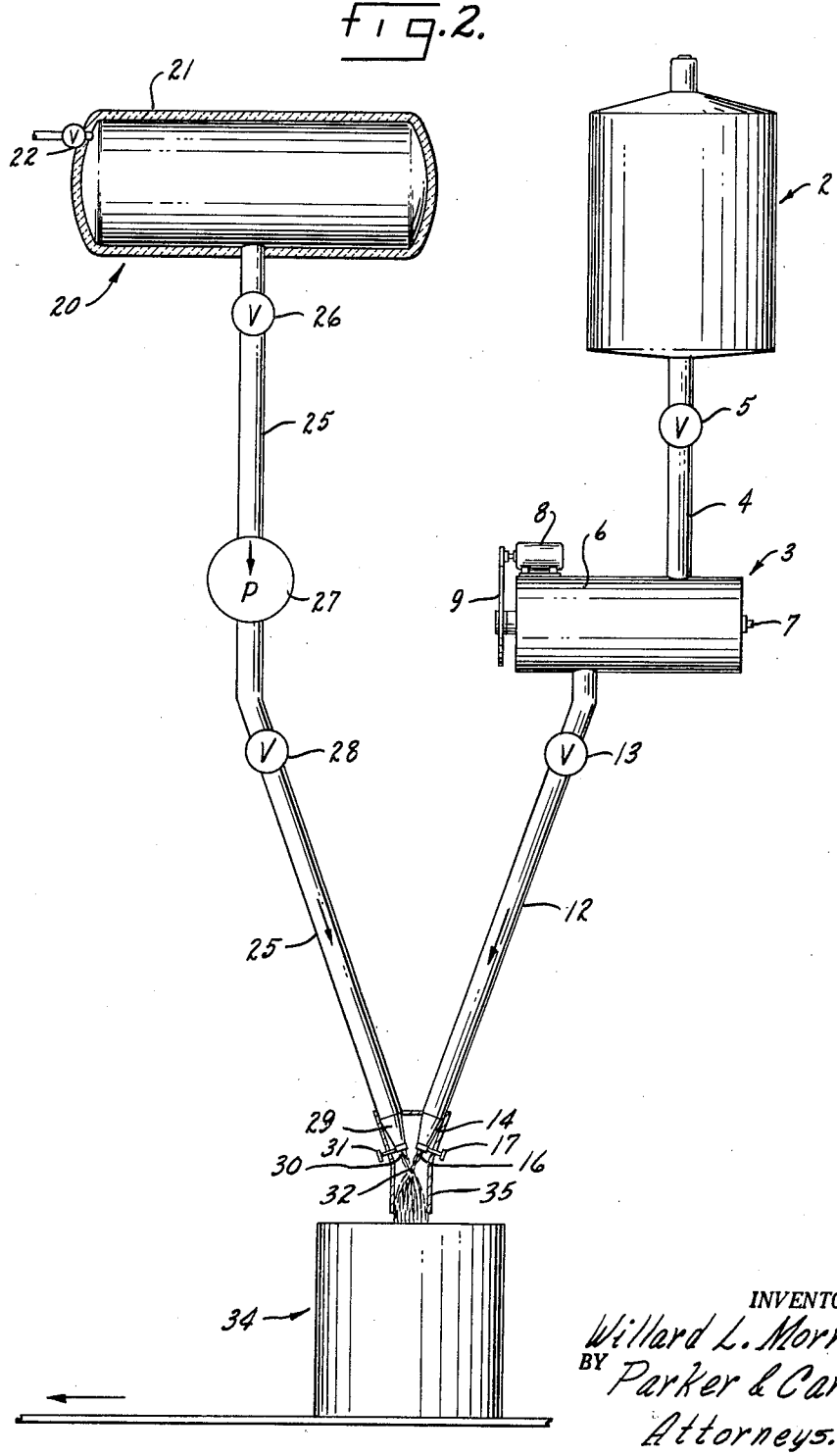

3,068,105
METHOD OF PREPARING A FROZEN FOOD PRODUCT
Willard L. Morrison, Lake Forest, Ill., assignor to Liquefreeze Company, Inc., New York, N.Y., a corporation of New York
Filed Oct. 26, 1960, Ser. No. 65,099
7 Claims. (Cl. 99—136)

This invention relates to the preparation and handling of foodstuffs such as ice cream, sherbets, ices and the like and has for one object to provide a method for preparing and handling such foodstuffs.

Another object is to provide a method for producing such foodstuffs which is considerably more economical and faster than methods heretofore employed.

Another object is to provide a method of preparing frozen foods such as ice cream which utilizes a liquid nitrogen spray for the freezing and churning heretofore required.

Another object is to provide a new frozen food product of the class of ice cream, sherbet, and the like.

Food products of the type in which I am primarily interested are normally comprised of liquids, which might be water, milk and other dairy products, plus flavoring and solids.

Such frozen food products have normally been produced by a process which includes mixing the various ingredients necessary to the final product, churning and aerating the mixture, and lowering the temperature surrounding the churning mixture by refrigerating the container to produce a fine grained semi-solid product. The constant churning slows the freezing process and causes the mixture to harden or congeal uniformly. It also produces a fine grained or textured product. The product, which in this stage includes a large quantity of minuscule air pockets, is eventually poured or "squirted" into containers suitable for ultimate distribution and then hardened. This final hardening process is normally carried out in a hardening room with the temperature set far below the churning temperature.

It is proposed to eliminate the laborious and time consuming churning and freezing operation heretofore considered necessary. To carry out the process, a spray of liquid nitrogen is directed into a spray of liquid product mix to produce a semi-solid frozen ice cream, sherbet, ice or the like. The semi-solid foodstuff is immediately deposited into suitable containers. The nitrogen is sprayed at approximately —320 degrees F. at atmospheric pressure. Due to the great amount of surface area of the sprayed particles exposed to the liquid nitrogen, the hardening process will be almost instantaneous and a great saving in time and expense realized. The primary advantages of churning the mixture while it is freezing are retained in that uniform freezing takes place throughout the whole mixture and a fine textured product results. The spray, in effect, is actually providing an instantaneous churning process.

A substantial quantity in the nitrogen will be present in gaseous form in the final semi-solid pourable mass. This, of course, is due to the vaporization of the liquid nitrogen by the latent heat of the mix. Since the nitrogen is odorless and tasteless, the resultant product is for all practical purposes identical to ice cream or similar frozen food products. The individual particles of the semi-solid food product are maintained in a generally inert atmosphere being surrounded by minuscule pockets of gaseous nitrogen, and the opportunities for oxidation and consequent spoilage are substantially lessened.

After the semi-solid food product is delivered to containers, it is hardened for shipment or storage. Although conventional hardening methods might be used, one might also expose the containers to additional liquid nitrogen treatment. The containers might be bodily immersed in, alternatively, liquid nitrogen might be sprayed over them.

This invention is illustrated more or less diagrammatically in the accompanying drawings, wherein—

FIGURE 1 shows a diagrammatic flow sheet for one variation of the method; and

FIGURE 2 shows a diagrammatic flow sheet for another variation of the invention.

Like parts are indicated by like numerals throughout the specification and drawings.

A mixing receptacle is shown at 2 in FIGURE 1. The mixing receptacle might have a paddle therein (not shown) for stirring the product mix into a substantially homogeneous state suitable for pressurized atomization. The mixing container might have a removable top, for example, to facilitate the deposition of ingredients therein. A conventional screw type pump 3 is connected through suitable piping to the container 2. A flow regulator valve 5 is interposed in the piping 4. The valve is of conventional construction.

The pump 3 includes an outer liquid tight shell 6 having an axially extending shaft 7 rotatably mounted therein. The shaft carries a suitable screw blade, not shown, which is driven from a conventional electric motor 8, through a pulley and belt connection 9. It will be understood that the screw type pump is shown only as an example and any of a variety of pumps might be utilized.

Extending from the discharge end of the pump is suitable piping 12 which has a conventional flow regulator valve 13. The piping 12 has a discharge nozzle 14 at its free end which extends into and is connected to an upstanding arm of a generally Y-shaped discharge pipe 15. the nozzle has an orifice 16 at its end, the orifice having an adjusting screw 17 for adjusting the size of the orifice and consequently the fineness and volume of the spray.

Discharge pipe 15 includes diverging, upwardly extending arms 18 and 19. The arms 18 and 19 are shown to be curved to a certain extent adjacent their juncture, as seen in FIGURE 1. However, they might be curved more or less at this point, as desired, for reasons which will be hereinafter explained.

A tank 20 having insulation 21 wrapped therearound provides a source of liquid nitrogen. Liquid nitrogen is supplied to the tank through a conventional nonreturn valve 22.

Depending from the tank 20 is a liquid nitrogen delivery pipe 25 which has a conventional flow regulator valve 26 and a pump 27. Another flow regulator valve 28 is located below the pump. The pump 27 might be of any well-known construction. In this instance, it is a rotary type pump.

The delivery pipe 25 has a discharge nozzle 29 at its free end, the nozzle extending into the other upstanding arm 19 of the Y-shaped discharge pipe 15. The nozzle terminates in an orifice 30. Adjusting screw 31 is provided to vary the orifice opening and control the volume and fineness of the spray. The spray of liquid nitrogen and that of the product mix are directed into a mixing zone 32 and the downwardly extending leg 33 of the Y-shaped discharge pipe 15. Depending upon the degree of curvature of the arms 18 and 19 adjacent their juncture, the sprays will be deflected off the inner walls of their respective arms to a greater or lesser extent. The extent to which they are deflected in turn effects the angle at which the sprays meet and commingle. Leg 33 extends into a product receiving container which might be a gallon ice cream container, for example. This container is shown at 34. It will be understood, however, that it might be of any size or configuration.

An alternative form of this new method is shown generally in FIGURE 2. The equipment used in the process embodying this variation is substantially identical to that shown in FIGURE 1 with only minor exceptions.

The nozzles 14 and 29 and orifices 16 and 30 are so positioned as to direct liquid nitrogen and mix into contact with one another in a housing 35 enclosing both orifices and positioned above the receiving container 34. The semi-solid thus formed is, in effect, extruded from the housing into the container.

The use and operation of this invention are as follows:

In the method illustrated diagrammatically in FIGURE 1, the product mix is stirred and churned in mixing receptacle 2 into a homogeneous liquid state capable of being sprayed through a restricted orifice. The liquid mix passes through pipe 4 and flow regulator valve 5 into screw type pump 3. Pump 3 forces the liquefied product mix out through pipe 12 under pressure. This pressurized stream of liquid mix then passes through flow regulator valve 13 and is ejected from orifice 16 of nozzle 14 in a spray of predetermined fineness. The fineness of the spray is controlled by the screw 17 varying the orifice size. As will be seen in FIGURE 1, the finely sprayed product mix is directed down one upstanding arm 18 of the Y-shaped delivery pipe 15 into the downwardly extending leg 33 thereof.

Simultaneously with the atomization of the liquid product mix, liquid nitrogen at atmospheric pressure and at a temperature in the neighborhood of −320 degrees F. is directed down the upstanding arm 19 of the Y-shaped delivery pipe 15 in such a manner that it commingles with the atomized liquid product mix spray in what may be termed a mixing zone 32 in the upstanding leg 33 of the delivery pipe 15. If the arms 18 and 19 are straight, or only slightly curved, as shown in FIGURE 1, the sprays will meet at an acute angle and the downward component force exerted by each pressurized spray will force the expanded resultant product from leg 33 into container 34. If the legs are curved to a greater extent, however, the sprays will be deflected into each other almost head on. In this case, the product will not be ejected as forcefully and rapidly from the delivery pipe leg 33.

The liquid nitrogen might be stored in a container such as a storage tank 20 or in any suitable pressure tight container. The tank is surrounded by a layer of insulation 21. As more liquid nitrogen vaporizes, the pressure builds up. The liquid nitrogen is forced out of the tank by the pressure developed therein and its flow to the rotary pump 27 is controlled by flow regulator valve 26. Rotary pump 27 establishes quantity and volume flow rates and forces liquid nitrogen under pressure through flow regulator valve 28. This valve can also be adjusted to regulate quantity and volume flow rates. The liquid nitrogen is then sprayed out of nozzle 29.

As described above, the liquid nitrogen from nozzle 29 is directed down one upstanding arm of the Y-shaped delivery pipe into commingling relationship with the atomized fluid product mix in the mixing zone 32. Due to the large amount of surface area of the tiny droplets of sprayed liquid product mix exposed to the liquid nitrogen, the nitrogen spray is able to almost instantaneously contact and congeal the mix into a soft, flowable state. The product mix has actually been instantaneously churned as it is chilled and congealed and the result is a fine grained, smooth textured product which resembles at this stage the well known soft and flowable "frozen custard."

Upon freezing or congealing, of course, the mix expands considerably and this phenomena, in conjunction with the pressure exerted on it by the sprays as they are emitted from their respective nozzles, forces the resultant product mix out of the bottom of the Y-shaped delivery pipe 15 through leg 33 into any suitable container. A gallon ice cream container of well-known construction is shown as illustrative.

The method shown in FIGURE 2 is substantially similar to that of FIGURE 1, the primary difference being the substitution of the sleeve 35 for the Y-shaped delivery pipe 15.

After the containers are filled with soft ice cream, sherbet or ice, for example, they would normally be further hardened by storage for a predetermined duration in hardening rooms kept at a temperature considerably below the freezing temperature of the product mix. However, as an alternative, the containers might be immersed in liquid nitrogen or sprayed with liquid nitrogen to further harden the food product.

During the freezing process, the nitrogen in its gaseous state, after commingling with the sprayed liquid product mix, forms minuscule pockets within the mix. These, of course, take the place of the normal tiny air bubbles in ice cream, for example, and inhibit oxidation, since the nitrogen is inert. The ice cream will not spoil as quickly as any heretofore known as a result.

It will be noted that a number of controls are provided in each of the systems for varying the quantity and volume flow of the liquid product mix and the liquid nitrogen. For example, by manipulating the flow regulator valves 5 or 13, or the speed of the pump 3, the operator can vary the quantity and volume of mix emitted from the nozzle 14, while the orifice control 17 varies the fineness of the spray. In turn, flow regulator valves 26 and 28 and rotary pump 27 are each individually adjustable to permit varying the volume and quantity of liquid nitrogen emitted from the nozzle 29. As a result of having these various control devices, the operator has a wide range of controls at his fingertips and consequently can easily and rapidly correct flow rates, etc.

It should also be understood that variations in the arrangement of the mixing chambers for the liquid nitrogen and product mix may be made within the scope of the invention. The two orifices could, for example, be arranged tangentially to a mixing sleeve 35 opposite one another.

While I have shown certain means for mixing, pumping and spraying the liquid product mix and other means for storing, pumping and spraying the liquid nitrogen, it will be apparent that many modifications and changes in the size, number, shape, disposition and location of parts might be made in the equipment shown without departing materially from the spirit of my invention. I wish, therefore, that the disclosure be taken as, in a broad sense, illustrative rather than as limiting me to the specific forms herein shown.

I claim:

1. A method of preparing frozen food products of the general class including ice cream, sherbets and ices comprising the steps of atomizing a prepared liquid product mix, atomizing liquid nitrogen and commingling the atomized liquid nitrogen at atmospheric pressure with the atomized product mix whereby the heat is extracted from the mix by the nitrogen vaporization which follows and the mix is rapidly congealed into a frozen food product.

2. A method of preparing frozen food products of the general class including ice cream, sherbets and ices comprising the steps of atomizing a prepared liquid product mix, directing a spray of the atomized mix into a mixing zone where the pressure is atmospheric, atomizing liquid nitrogen and spraying the atomized liquid nitrogen into the mixing zone such that the sprays commingle and heat is withdrawn from the mix as the nitrogen vaporizes so as to congeal the product and form a frozen food product.

3. A method of preparing frozen food products of the general class including ice cream, sherbets and ices comprising the steps of preparing a generally homogeneous liquid product mix suitable for atomization, spraying the liquid mix under pressure from an orifice into a mixing zone where the pressure is atmospheric, spraying liquid nitrogen from an orifice into said mixing zone whereby the atomized liquid nitrogen commingles with the atomized liquid product mix and withdraws heat therefrom as it vaporizes to congeal the mix and form a frozen food product.

4. The method of claim 3 further characterized in that said mixing zone is surrounded by an enclosure, said sprays of liquid mix and liquid nitrogen being directed into said enclosure, the frozen food product being formed within and ejected from said enclosure by means including pressure built up by its own expansion.

5. A method of preparing frozen food products of the general class including ice cream, sherbets and ices comprising the steps of preparing a homogeneous liquid product mix suitable for atomization, spraying the mix from an orifice under pressure into a mixing zone where the pressure is atmospheric, providing a source of liquid nitrogen, spraying the liquid nitrogen from an orifice into said mixing zone whereby it commingles with the liquid mix spray and withdraws heat therefrom as it vaporizes so as to cause said liquid product mix to congeal into a semi-solid food product having innumerable minuscule pockets of gaseous nitrogen therein and directing the semi-solid frozen food product into a container.

6. A method of preparing a frozen food product of the general class including ice cream, sherbets and ices comprising the steps of preparing a homogeneous liquid product mix suitable for atomization, spraying the mix from an orifice under pressure into a mixing zone where the pressure is atmospheric, providing a source of liquid nitrogen, spraying the liquid nitrogen from an orifice under pressure into said mixing zone whereby it commingles with the liquid product mix and withdraws heat therefrom as it vaporizes so as to cause said liquid product mix to congeal into a semi-solid food product having innumerable minuscule pockets of gaseous nitrogen therein, directing the semi-solid frozen food product into a suitable container and hardening the resultant product by subjecting the container to a temperature below the freezing point of the liquid product mix for a suitable length of time.

7. A method of preparing a frozen food product of the general class including ice cream, sherbets and ices comprising the steps of preparing a homogeneous liquid product mix suitable for atomization, providing an enclosed mixing zone having a discharge port, spraying the mix from an orifice under pressure into the enclosed mixing zone whereby it commingles with the liquid product mix spray and withdraws heat therefrom as it vaporizes so as to cause said product mix to congeal into a semi-solid frozen food product and expand as it congeals, the expanding semi-solid food product being ejected from said outlet port as more and more food product is formed.

References Cited in the file of this patent

UNITED STATES PATENTS

| | | |
|---|---|---|
| 1,636,345 | Willson | July 19, 1927 |
| 2,375,833 | Urquhart | May 15, 1945 |
| 2,909,433 | Morrison | Oct. 20, 1959 |